United States Patent
Wu

(10) Patent No.: US 10,952,112 B2
(45) Date of Patent: Mar. 16, 2021

(54) DEVICE AND METHOD OF HANDLING A HANDOVER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/378,572

(22) Filed: Apr. 9, 2019

(65) Prior Publication Data
US 2019/0313306 A1 Oct. 10, 2019

Related U.S. Application Data

(60) Provisional application No. 62/655,217, filed on Apr. 9, 2018, provisional application No. 62/675,738, filed on May 23, 2018, provisional application No. 62/676,265, filed on May 24, 2018, provisional application No. 62/688,371, filed on Jun. 21, 2018.

(51) Int. Cl.
| | |
|---|---|
| *H04W 36/00* | (2009.01) |
| *H04W 36/08* | (2009.01) |
| *H04W 76/27* | (2018.01) |
| *H04W 76/11* | (2018.01) |
| *H04W 76/25* | (2018.01) |

(52) U.S. Cl.
CPC ....... *H04W 36/08* (2013.01); *H04W 36/0038* (2013.01); *H04W 76/11* (2018.02); *H04W 76/25* (2018.02); *H04W 76/27* (2018.02)

(58) Field of Classification Search
CPC ...... H04L 29/08; H04L 67/141; H04W 36/00; H04W 36/0022; H04W 36/0033; H04W 36/0038; H04W 36/0055; H04W 36/0066; H04W 36/0072; H04W 36/08; H04W 36/14; H04W 36/22; H04W 76/11; H04W 76/25; H04W 76/27; H04W 84/04; H04W 84/042

See application file for complete search history.

(56) References Cited

U.S. PATENT DOCUMENTS 10,178,585 B2 * 1/2019 Huang-Fu ......... H04W 36/0022
10,595,250 B2 * 3/2020 Keller .................. H04W 36/14
(Continued)

OTHER PUBLICATIONS

Huawei, Update of 4G to 5G interworking handover with Nx interface, SA WG2 Meeting #122, 11 pages, Jun. 2017.*
(Continued)

*Primary Examiner* — Frank Duong
(74) *Attorney, Agent, or Firm* — Winston Hsu

(57) ABSTRACT

A communication device for handling a handover is configured to execute the instructions of: communicating with a base station (BS) via a first cell; receiving a radio resource control (RRC) message configuring the communication device to connect to a second cell, from the first cell; connecting to the second cell according to the RRC message, and transmitting a RRC response message for responding to the RRC message to the second cell; and exchanging a plurality of Evolved Packet System (EPS) Non Access Stratum (NAS) messages with an Evolved Packet Core (EPC) network according to an EPS NAS protocol via the second cell, when the RRC message does not include a Protocol Data Unit (PDU) Session Identity (ID), includes an EPS bearer ID or includes a handover type of a "5GStoEPS".

8 Claims, 5 Drawing Sheets

(56) References Cited

U.S. PATENT DOCUMENTS

| | | | | |
|---|---|---|---|---|
| 2017/0251405 A1* | 8/2017 | Stojanovski | ...... | H04W 36/0016 |
| 2018/0192333 A1* | 7/2018 | Wu | ................ | H04W 36/0011 |
| 2018/0192337 A1* | 7/2018 | Ryu | ................ | H04W 36/0066 |
| 2018/0255496 A1* | 9/2018 | Kim | ...................... | H04W 76/27 |
| 2020/0037207 A1* | 1/2020 | Centonza | ................ | H04W 8/08 |
| 2020/0229059 A1* | 7/2020 | Xu | ........................ | H04W 36/30 |

OTHER PUBLICATIONS

Huawei, Update of 4G to 5G interworking handover with Nx interface, SA WG2 Meeting #122, 9 pages, Jun. 2017.*
3GPP TS 24.501 V1.0.0 (Mar. 2018).
3GPP TS 24.301 V15.2.0 (Mar. 2018).

* cited by examiner

DEVICE AND METHOD OF HANDLING A HANDOVER

CROSS REFERENCE TO RELATED APPLICATIONS

This application claims the benefit of U.S. Provisional Applications No. 62/655,217, filed on Apr. 9, 2018, No. 62/675,738, filed on May 23, 2018, No. 62/676,265, filed on May 24, 2018, and No. 62/688,371, filed on Jun. 21, 2018, which are incorporated herein by reference.

BACKGROUND OF THE INVENTION

1. Field of the Invention

The present invention relates to a communication device and a method used in a wireless communication system, and more particularly, to a communication device and a method of handling a handover.

2. Description of the Prior Art

A user equipment (UE) may communicate with a first base station (BS) and the first BS may hand over the UE to a second BS. However, it is unknown how the UE communicates with the second BS, e.g., when the UE is unaware of which core network is connected with the second BS. Thus, how to handle the handover is an important problem to be solved.

SUMMARY OF THE INVENTION

The present invention therefore provides a method and related communication device for handling a handover to solve the abovementioned problem.

A communication device for handling a handover comprising at least one storage device and at least one processing circuit, coupled to the at least one storage device, wherein the at least one storage device stores instructions, and the at least one processing circuit is configured to execute the instructions of: communicating with a base station (BS) via a first cell; receiving a radio resource control (RRC) message configuring the communication device to connect to a second cell, from the first cell; connecting to the second cell according to the RRC message, and transmitting a RRC response message for responding to the RRC message to the second cell; and exchanging a plurality of Evolved Packet System (EPS) Non Access Stratum (NAS) messages with an Evolved Packet Core (EPC) network according to an EPS NAS protocol via the second cell, when the RRC message does not include a Protocol Data Unit (PDU) Session Identity (ID), includes an EPS bearer ID or includes a handover type of a "5GStoEPS".

These and other objectives of the present invention will no doubt become obvious to those of ordinary skill in the art after reading the following detailed description of the preferred embodiment that is illustrated in the various figures and drawings.

DETAILED DESCRIPTION

Figure 1:
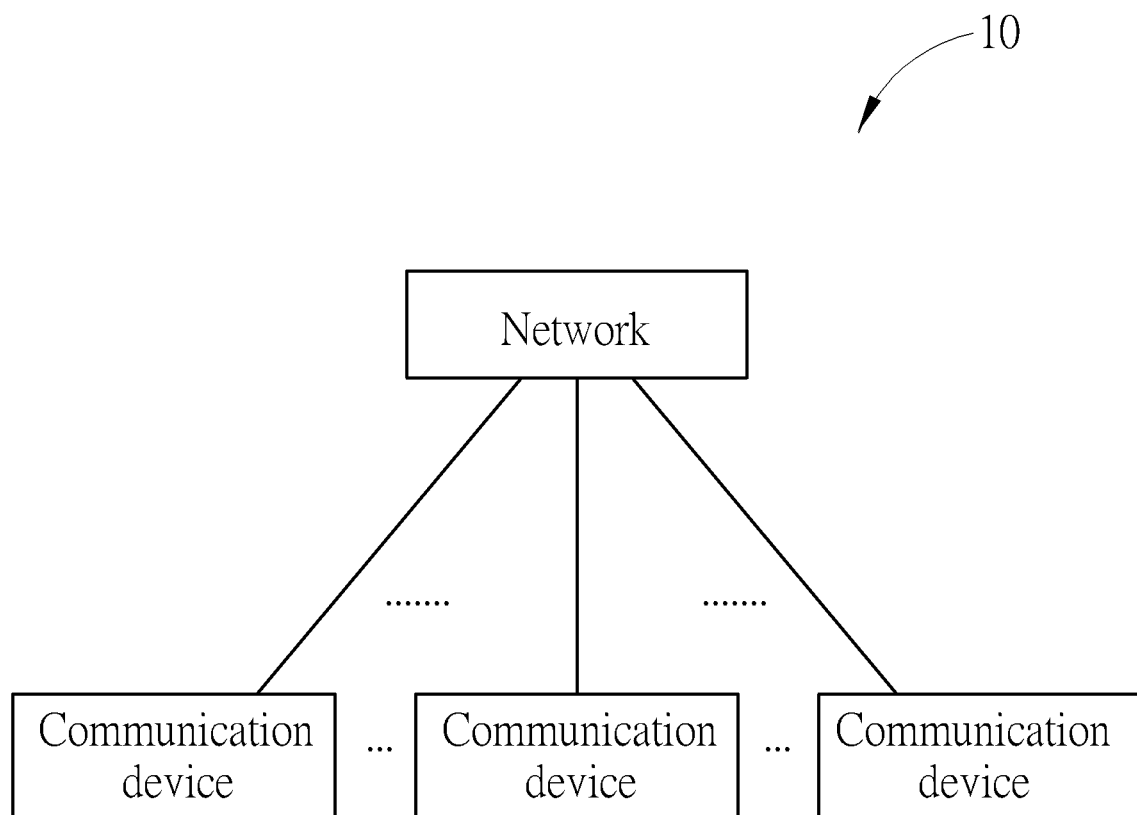
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via at least one carrier in the same or different duplexing modes (e.g., frequency-division duplexing (FDD), time-division duplexing (TDD) or flexible duplexing).

In FIG. 1, the network and the communication devices are simply utilized for illustrating the structure of the wireless communication system 10. The network may include at least one of a Universal Terrestrial Radio Access (Network) (UTRA(N)) and an evolved UTRA(N) (EUTRA(N)). The UTRA(N) may include at least one radio network controller (RNC) and Node-B. The EUTRA(N) may include at least one evolved Node-B (eNB) which may connect to an evolved packet core (EPC) network and/or a fifth generation (5G) core (5GC) network (5GCN).

The communication device may be a user equipment (UE), a mobile phone, a laptop, a tablet computer, an electronic book, a portable computer system, a vehicle or an airplane. In addition, the network and the communication device can be seen as a transmitter or a receiver according to direction (e.g., transmission direction). For example, for an uplink (UL), the communication device is the transmitter and the network is the receiver. For example, for a downlink (DL), the network is the transmitter and the communication device is the receiver.

Figure 2:
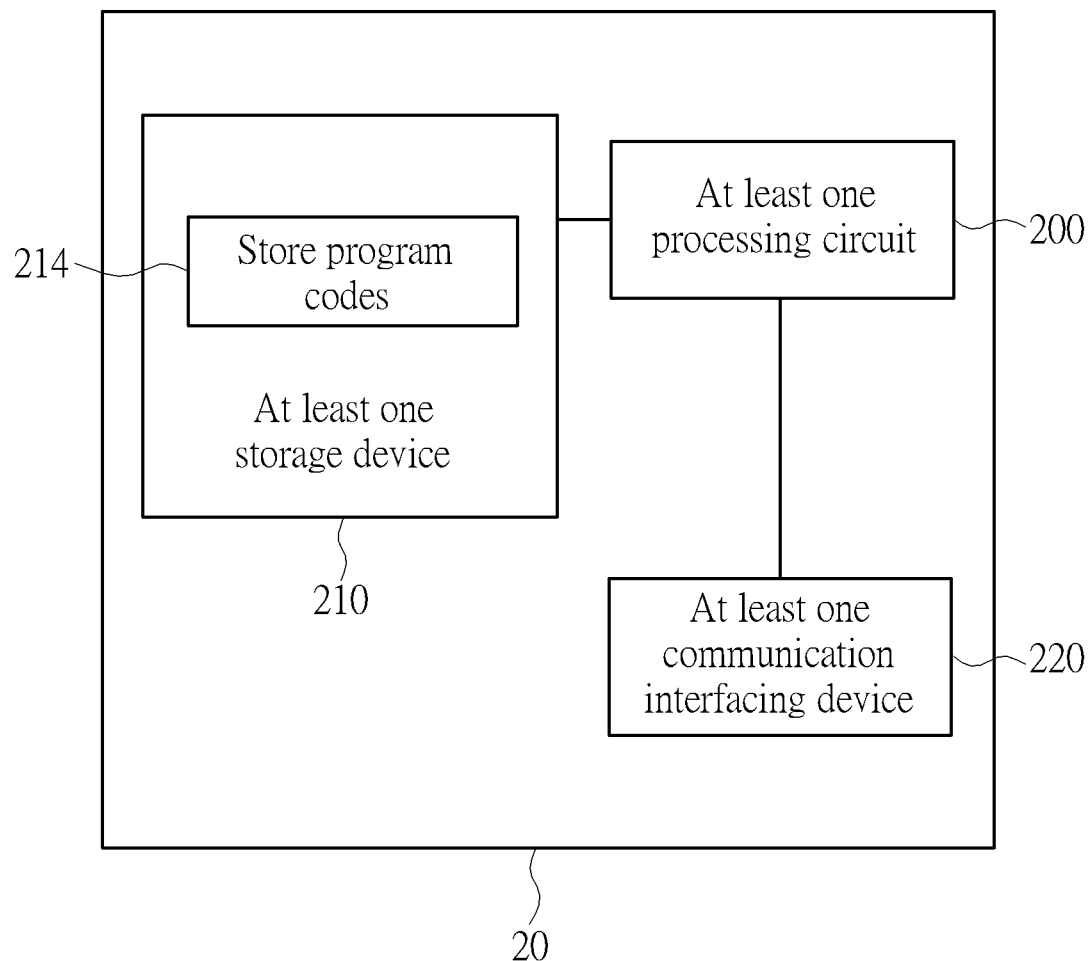
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device in FIG. 1, to simplify the illustration of the embodiments.

Figure 3:
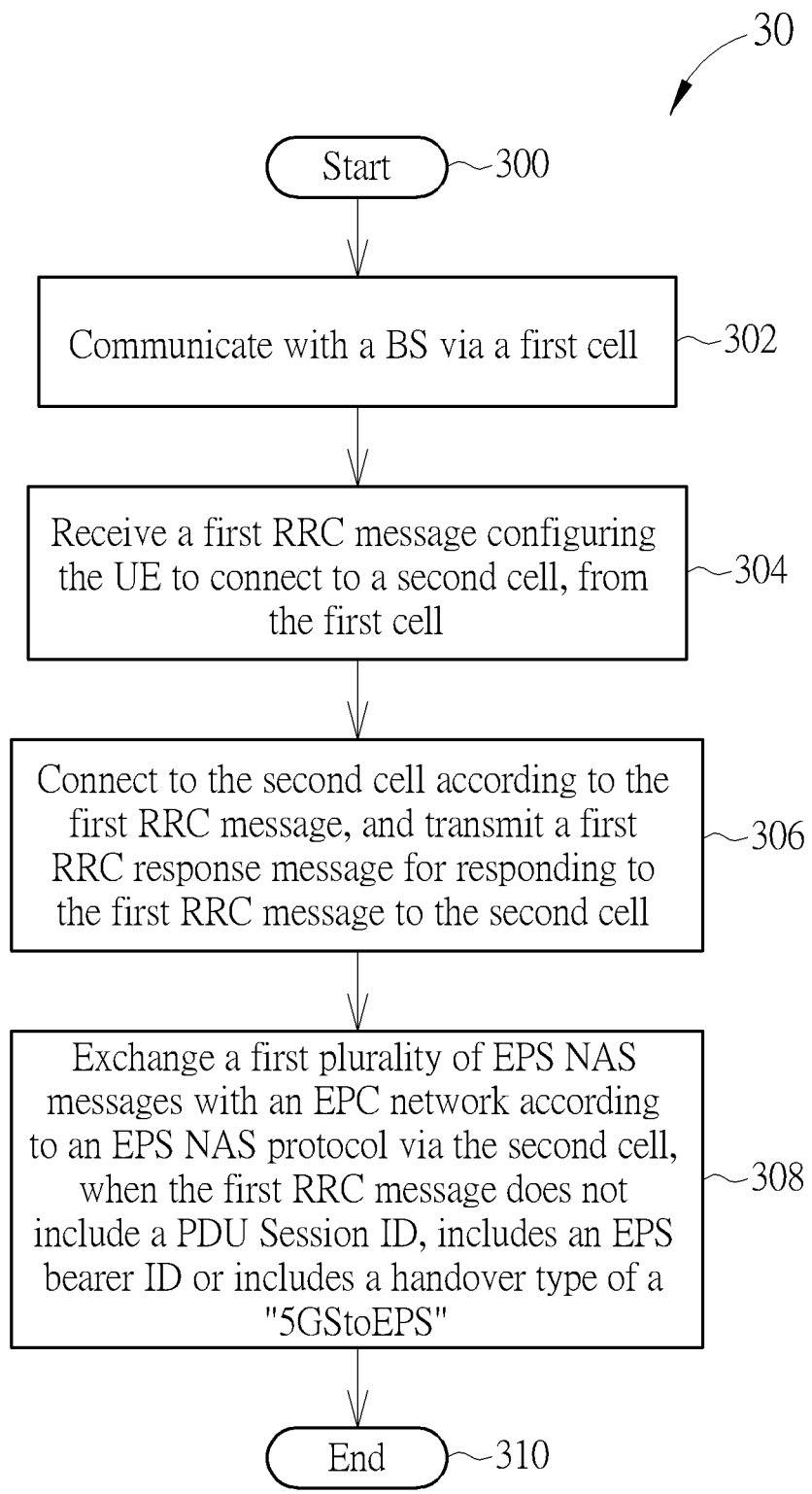
FIG. 3 is a flowchart of a process according to an example of the present invention.

A process 30 in FIG. 3 is utilized in a UE, and includes the following steps:

Step 300: Start.

Step 302: Communicate with a BS via a first cell.

Step 304: Receive a first radio resource control (RRC) message configuring the UE to connect to (e.g., handover to) a second cell, from the first cell.

Step 306: Connect to the second cell according to the first RRC message, and transmit a first RRC response message for responding to the first RRC message to the second cell.

Step 308: Exchange a first plurality of Evolved Packet System (EPS) Non Access Stratum (NAS) messages with an Evolved Packet Core (EPC) network according to (e.g., by using) an EPS NAS protocol via the second cell, when (e.g., if) the first RRC message does not include a Protocol Data Unit (PDU) Session Identity (ID), includes an EPS bearer ID or includes a handover type of a "5GStoEPS" (i.e., a 5G system (5GS) to an EPS handover).

Step 310: End.

According to the process 30, whether the UE (e.g., determines to) use the EPS NAS protocol is determined according to/depending on whether the first RRC message includes the PDU Session ID, the EPS bearer ID or the handover type of the "5GStoEPS".

The following examples may be applied to the process 30.

In one example, the BS is a new radio (NR) BS. In one example, the first cell is a first NR cell.

In one example, the BS is a first EUTRA BS. In one example, the first cell is a first EUTRA cell. In one example, the UE exchanges a first plurality of 5GS NAS messages with a first 5GCN according to (e.g., by using) a first 5GS NAS protocol via the first EUTRA BS. In one example, the UE connects to the first 5GCN. The UE communicates with the first EUTRA BS via the first EUTRA cell, and may exchange the first plurality of 5GS NAS messages with the first 5GCN according to (e.g., by using) the first 5GS NAS protocol via the first EUTRA cell.

In one example, the second cell is a second EUTRA cell. In one example, the second EUTRA cell and the first EUTRA cell are the same or different. In one example, the second EUTRA cell and the first EUTRA cell belong to the first EUTRA BS. In one example, the second EUTRA cell belongs to a second EUTRA BS and the first EUTRA cell belongs to the first EUTRA BS.

In one example, the UE exchanges a second plurality of 5GS NAS messages with a second 5GCN according to (e.g., by using) a second 5GS NAS protocol via the second cell, when (e.g., if) the first RRC message includes the PDU Session ID or includes a handover type of an "Intra5GS" (i.e., an intra 5GS inter-radio access technology (RAT) handover). That is, the UE (e.g., determines to) use the EPS NAS protocol or a 5GS NAS protocol (e.g., the first or second 5GS NAS protocol) according to/depending on whether the first RRC message includes the PDU Session ID, the EPS bearer ID, the handover type of the "5GStoEPC", or the handover type of the "Intra5GS".

The second plurality of 5GS NAS messages and the first plurality of 5GS NAS messages may be the same or different. The second 5GCN and the first 5GCN may be the same or different. The second 5GS NAS protocol and the first 5GS NAS protocol may be the same or different.

In one example, the first RRC message includes a first handover security configuration (securityConfigHO) defined in the 3rd Generation Partnership Project (3GPP) specification (e.g., 3GPP release 15). The first securityConfigHO includes a handover type (handoverType) field indicating the "5GStoEPS" or the "Intra5GS". The UE may determine the handover type of the "5GStoEPS" or the handover type of the "intra5GS" according to the handoverType field. The first securityConfigHO may include a security algorithm configuration (SecurityAlgorithmConfig) which includes a ciphering algorithm or an integrity protection algorithm. The UE may use the ciphering algorithm configured to encrypt data transmitted to the second cell and/or decrypt data received from the second cell, when handing over to the second cell. The UE may use the integrity protection algorithm configured to perform an integrity protection on the data transmitted to the second cell, when handing over to the second cell. The UE may use an integrity check algorithm configured in the security algorithm configuration to perform an integrity check on the data received from the second cell, when handing over to the second cell.

In one example, the first RRC message includes the first securityConfigHO for a first 3GPP release, and does not include a second securityConfigHO for a second 3GPP release defined in the 3GPP specification. The second securityConfigHO does not indicate the "5GStoEPS" nor the "Intra5GS". The second 3GPP release is earlier than the first 3GPP release. For example, the first 3GPP release is 3GPP release 15 and the second 3GPP release is 3GPP release 8.

In one example, the first securityConfigHO includes information or parameter(s) being used by the UE to derive security key(s) for performing a handover from the 5GS to the EPS. The information or parameter(s) may be a next hop chaining count (e.g., nextHopChainingCount) defined in the 3GPP specification (e.g., 3GPP release 15, or a 3GPP release version earlier that 3GPP release 15). The information or parameter(s) may include NAS security parameters to NGRAN defined in the 3GPP specification (e.g., 3GPP release 15) for performing a handover from the EPS to the 5GS.

In one example, the handover type of the "Intra5GS" is replaced by a handover type of an "IntraRAT". In another example, the "5GS" is replaced by the "5GC". In one example, the "EPS" is replaced by the "EPC".

In the example, the first RRC message does not include a core network (CN) type indication (e.g., explicitly) indicating that the 5GS or the EPS is applied.

In one example, the first RRC message does not include the PDU Session ID, and includes the EPS bearer ID. In one example, the first RRC message includes either the PDU Session ID or the EPS bearer ID. The UE (e.g., determines to) use the 5GS NAS protocol or the EPS NAS protocol according to/depending on the first RRC message includes the PDU Session ID or the EPS bearer ID. For example, Step 308 may be replaced by the following step:

Step 308a: Exchange the first plurality of EPS NAS messages with the EPC network according to (e.g., by using) the EPS NAS protocol via the second cell, when (e.g., if) the first RRC message does not include the PDU Session ID and includes the EPS bearer ID.

In one example, the first RRC message does not include the PDU Session ID, and does not include the EPS bearer ID. Accordingly, the UE may (e.g., determine to) use the 5GS NAS protocol to exchange the 5GS NAS messages (e.g., with the 5GCN) via the second cell.

In one example, after connecting to the second cell, the UE receives a second RRC message configuring the UE to connect to (e.g., handover to) a third EUTRA cell, from the second cell. The UE transmits a second RRC response message for responding to the second RRC message to the third EUTRA cell. The UE may exchange 5GS NAS messages according to (e.g., by using) the 5GS NAS protocol via the third EUTRA cell, when (e.g., if) the second RRC message includes the PDU Session ID.

In one example, the second RRC message does not include the PDU Session ID, and includes the EPS bearer ID. According to the EPS bearer ID, the UE may (e.g., determine to) use the EPS NAS protocol to exchange EPS NAS messages with the EPC network via the third EUTRA cell.

In one example, if the second RRC message neither include the PDU Session ID nor includes the EPS bearer ID, the UE may (e.g., determine to) use the EPS NAS protocol to exchange EPS NAS messages with the EPC network via the third EUTRA cell. In another example, if the second RRC message neither includes the PDU Session ID nor includes the EPS bearer ID, the UE may (e.g., determine to) use the 5GS NAS protocol to exchange EPS NAS messages with the 5GCN via the third EUTRA cell.

In one example, the 5GS NAS messages are 5GS Mobility Management (MM) messages or 5GS Session Management (SM) messages. In one example, the operation that the UE exchanges the 5GS NAS messages includes that the UE transmits a first 5G NAS message to the 5GCN (e.g., Access and Mobility Function (AMF) or Session Management Function (SMF)) and receives a second 5GS NAS message from the 5GCN. The 5GS MM messages and the 5GS SM messages may be defined in the 3GPP specification (e.g., TS 24.501, v1.0.0).

In one example, the EPS NAS messages are EPS MM messages or EPS SM messages. In one example, the operation that the UE exchanges the EPS NAS messages includes that the UE transmits a first EPS NAS message to the EPC network (e.g., Mobility Management Entity (MME)) and receives a second EPS NAS message from the EPC network. The EPS MM messages and the EPS SM messages may be defined in the 3GPP specification (e.g., TS 24.301 v15.2.0).

In one example, the first and second RRC messages are RRC Connection Reconfiguration messages (e.g., of the EUTRA). In one example, the first and second RRC response messages are RRC Connection Reconfiguration Complete messages (e.g., of the EUTRA).

In one example, the first RRC message includes a Service Data Adaptation Protocol (SDAP) configuration configuring at least one of a quality of service (QoS) flow ID, whether a SDAP header is present for a DL, whether the SDAP header is present for an UL, or whether a data radio bearer (DRB) to which the PDU Session ID associates is a default DRB. The UE applies (i.e., uses) the SDAP configuration.

In one example, the first RRC message includes a Mobility Control Information (e.g., MobilityControlInfo) information element (IE) configuring a random access (RA) channel configuration. The UE may transmit a RA preamble to the second cell according to the RA channel configuration. The UE may receive a RA response (RAR) from the second cell. The UE may transmit the first RRC response message to the second cell in the RAR according to (e.g., by using) an UL grant.

In one example, the first RRC message configures a DRB by including a DRB configuration. The DRB configuration may include a DRB ID identifying the DRB and a packet data convergence protocol (PDCP) configuration. The UE applies the DRB configuration. In one example, the first RRC message configures a signaling radio bearer (SRB) by including a SRB configuration. The SRB configuration may include a SRB ID identifying the SRB. The SRB configuration may include a PDCP configuration, when (e.g., if) the first RRC message includes the PDU Session ID. The SRB configuration may not include the PDCP configuration, when (e.g., if) the first RRC message does not include the PDU Session ID. The UE applies the SRB configuration.

In one example, the first RRC message includes a physical layer configuration, a medium access control (MAC) configuration and a radio link control (RLC) configuration. The UE applies these configurations.

In one example, the UE establishes a PDU Session (e.g., identified by the PDU Session ID) with the 5GCN via the first cell or a third cell. The third cell may be a second NR cell or a fourth EUTRA cell, before receiving the first RRC message. To establish the PDU Session, the UE transmits a PDU Session Establishment Request message including the PDU Session ID to the 5GCN via the first cell or the third cell. The UE receives a PDU Session Establishment Accept message responding to the PDU Session Establishment Request message, from the first cell or the third cell. The Session Establishment Accept message may or may not include the PDU Session ID. In one example, the EPS bearer ID is associated to the PDU Session ID and is included in the PDU Session Establishment Accept message.

In one example, the NR BS of the first cell receives the first RRC message from the second EUTRA BS of the second cell indirectly (e.g., via the 5GCN and/or the EPC network) or directly (e.g., via an interface between the NR BS and the second EUTRA BS), and may encapsulate the first RRC message into a NR RRC message. Then, the first EUTRA BS may transmit the NR RRC message to the UE.

Figure 4:
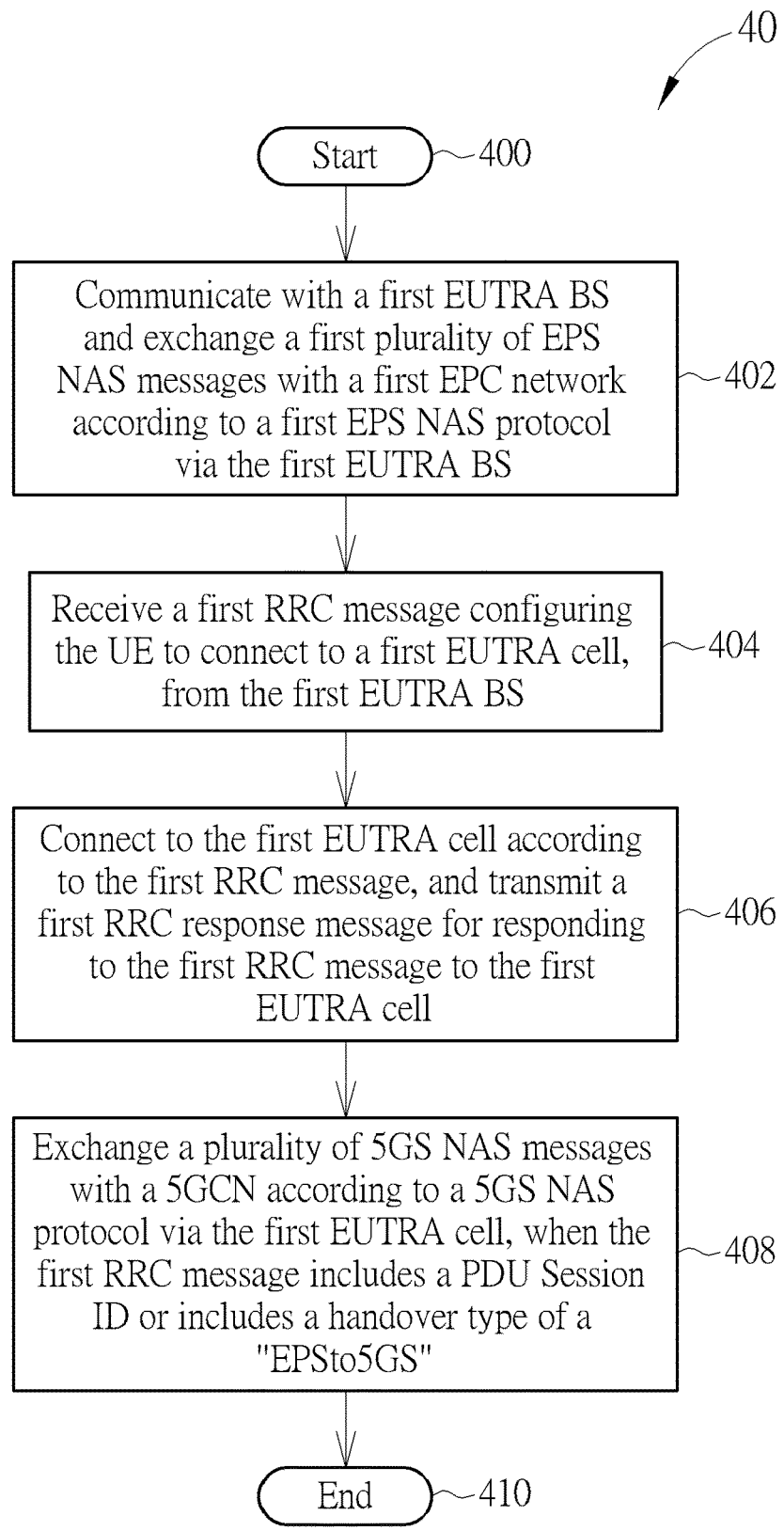
FIG. 4 is a flowchart of a process according to an example of the present invention.

A process 40 in FIG. 4 is utilized in a UE, and includes the following steps:

Step 400: Start.

Step 402: Communicate with a first EUTRA BS and exchange a first plurality of EPS NAS messages with a first EPC network according to (e.g., by using) a first EPS NAS protocol via the first EUTRA BS.

Step 404: Receive a first RRC message configuring the UE to connect to (e.g., handover to) a first EUTRA cell, from the first EUTRA BS.

Step 406: Connect to the first EUTRA cell according to the first RRC message, and transmit a first RRC response message for responding to the first RRC message to the first EUTRA cell.

Step 408: Exchange a plurality of 5GS NAS messages with a 5GCN according to (e.g., by using) a 5GS NAS protocol via the first EUTRA cell, when (e.g., if) the first RRC message includes a PDU Session ID or includes a handover type of a "EPSto5GS" (i.e., an EPS to a 5GS handover).

Step 410: End.

According to the process 40, the UE (e.g., determines to) use the EPS NAS protocol or the 5GS NAS protocol, according to/depending the first RRC message includes the PDU Session ID or the handover type of the "EPCto5GS".

The following examples may be applied to the process 40.

In one example, the UE exchanges a second plurality of EPS NAS messages with a second EPC network according to (e.g., by using) a second EPS NAS protocol via the first EUTRA cell, when (e.g., if) the first RRC message does not include a first securityConfigHO defined in the 3GPP specification (e.g., 3GPP release 15), includes an EPS bearer ID or includes a third securityConfigHO indicating a handover type of an "IntraLTE" (i.e., an intra LTE inter-RAT handover).

In one example, the third securityConfigHO is included in the first RRC message instead of in the first securityConfigHO.

Figure 5:
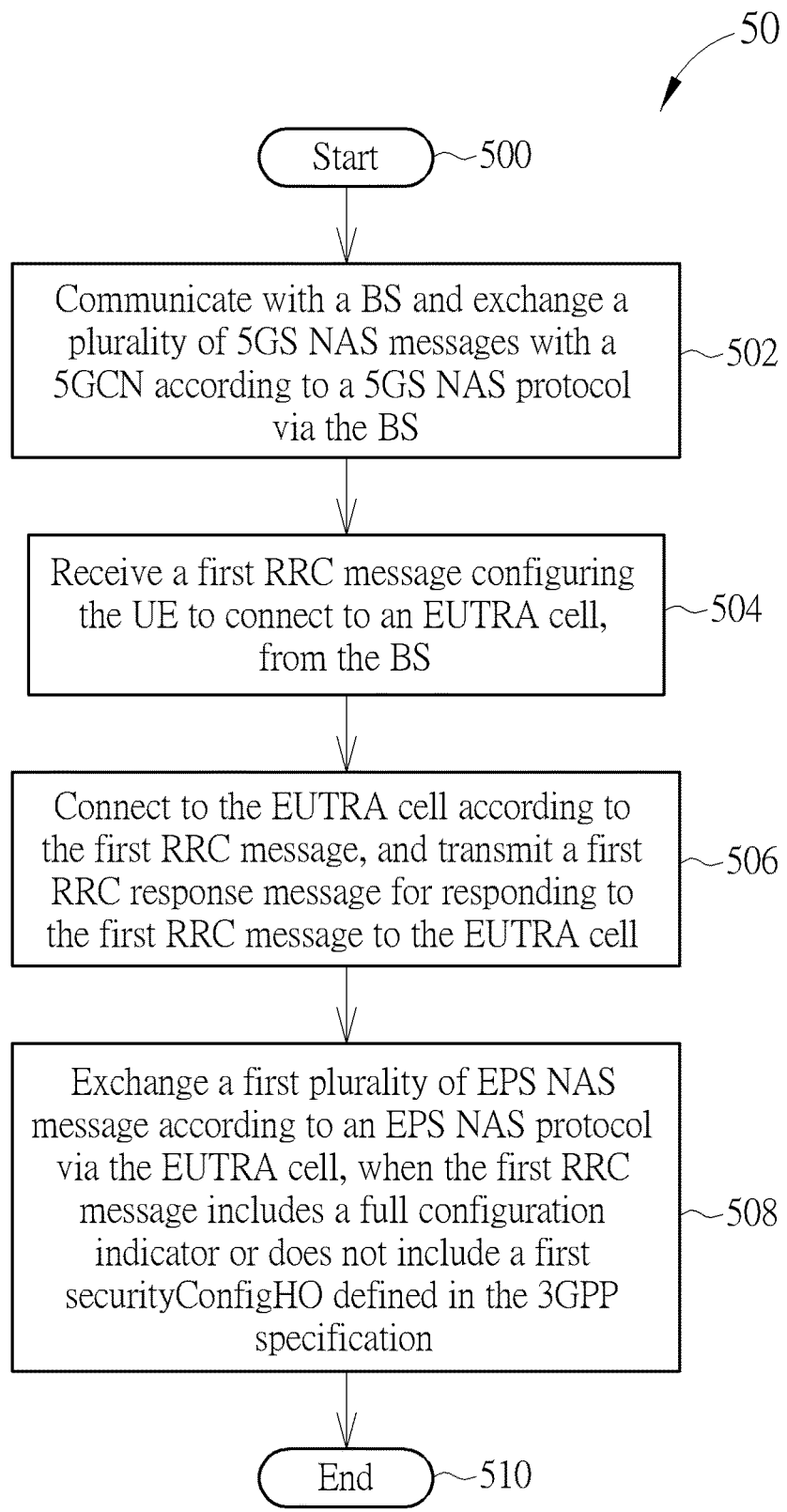
FIG. 5 is a flowchart of a process according to an example of the present invention.

A process 50 in FIG. 5 is utilized in a UE, and includes the following steps:

Step 500: Start.

Step 502: Communicate with a BS and exchange a plurality of 5GS NAS messages with a 5GCN according to a 5GS NAS protocol via the BS.

Step 504: Receive a first RRC message configuring the UE to connect to (e.g., handover to) an EUTRA cell, from the BS.

Step 506: Connect to the EUTRA cell according to the first RRC message, and transmit a first RRC response message for responding to the first RRC message to the EUTRA cell.

Step 508: Exchange a first plurality of EPS NAS message according to an EPS NAS protocol via the EUTRA cell, when (e.g., if) the first RRC message includes a full configuration indicator or does not include a first securityConfigHO defined in the 3GPP specification (e.g., 3GPP release 15).

Step 510: End.

According to the process 50, the UE (e.g., determines to) use the EPS NAS protocol or the 5GS NAS protocol, according to/depending on the first RRC message includes the full configuration indicator or the first securityConfigHO.

In one example, the BS includes (e.g., is) an EUTRA BS or a NR BS.

In one example, a second securityConfigHO defined in the 3GPP specification (e.g., a 3GPP release version earlier than 3GPP release 15) is included in the first RRC message instead of the first securityConfigHO.

In one example, the UE exchanges the first plurality of EPS NAS messages according to the EPS NAS protocol via the EUTRA cell, when (e.g., if) the RRC message does not include a PDU Session ID, includes an EPS bearer ID, includes a third securityConfigHO indicating a handover type of an "IntraLTE".

Example for the processes 30-40 may be applied to the process 50. The following examples may be applied to the processes 30-50.

In one example, the UE transmits an EPS Tracking Area Update (TAU) Request message or an EPS Attach Request message to the first EUTRA cell when (e.g., if) the UE uses the EPS NAS protocol to exchange EPS NAS messages via the first EUTRA cell, no matter a (e.g., registered) Tracking Area (TA) is changed or not. The TA may be a TA where the UE attaches or registers before connecting to the first ETURA cell. The UE transmits the EPS TAU Request message or the EPS Attach Request message even when the TA is not changed.

In one example, a first protocol layer of the UE may receive an indication message indicating a handover type (or a CN type) directly or via a second protocol layer, from a RRC layer of the UE. The RRC layer transmits the indication message according to/in response to the first RRC message. The UE sets the CN type in the indication message to the 5GCN, when (e.g., if) the first RRC message includes the PDU Session ID, includes the first securityConfigHO indicating the "EPSto5GS" or the "Intra5GS". The UE sets the CN type in the indication message to the EPC network, when (e.g., if) the first RRC message does not include the PDU Session ID, includes the EPS bearer ID, includes the first securityConfigHO indicating the "5GStoEPS", includes the third securityConfigHO indicating the "IntraLTE" or includes the full configuration. The UE sets the CN type in the indication message to the 5GCN, when (e.g., if) the first RRC message includes the full configuration and includes the PDU Session ID or includes a fourth securityConfigHO indicating an "InterLTE". The first protocol layer activates the 5GS NAS protocol, when (e.g., if) the CN type indicates the 5GCN and the UE uses/is using the EPS NAS protocol. The first protocol layer keeps using the 5GS NAS protocol, when (e.g., if) the CN type indicates the 5GCN and the UE uses/is using the 5GS NAS protocol. The first protocol layer activates the EPS NAS protocol, when (e.g., if) the CN type indicates the EPC network and the UE uses/is using the 5GS NAS protocol. The first protocol layer keeps using the EPS NAS protocol, when (e.g., if) the CN type indicates the EPC network and the UE uses/is using the EPS NAS protocol. The first protocol layer may be the NAS layer (e.g., EPS NAS layer or 5GS NAS layer) being used by the UE, or may be an inter-system protocol layer handling the inter-system change from the EPS to the 5GS or from the 5GS to the EPS.

In one example, the UE receives a third RRC message including the first RRC message from the BS (e.g., the NR BS or the first EUTRA BS in the process 30, the first EUTRA BS in the process 40, the EUTRA BS or the NR BS in the process 50). In one example, the third RRC message is a NR RRC message (e.g., Mobility From NR Command message). In one example, the third RRC message is an EUTRA RRC message (e.g., Mobility From EUTRA Command). A BS of the second cell may generate the first RRC message and forwards the first RRC message to the above BS. Then, the BS wraps/contains/encapsulates the first RRC message in the third RRC message.

In one example, there is no RRC message wrapping/encapsulating/containing the first RRC response message.

It should be noted that although the above examples are illustrated to clarify the related operations of corresponding processes. The examples can be combined and/or modified arbitrarily according to system requirements and/or design considerations. Message names and IE names described above are examples and should not narrow a scope of the invention. Embodiments for a network or a BS can be easily modified from the description above.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes 30-50 may be compiled into the program codes 214.

To sum up, the present invention provides a method and related communication device for handling a handover. The UE is aware of which core network is connected with the BS to which the UE perform the handover, according to the first RRC message. Thus, the problem regarding the handover is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A user equipment for handling a handover, comprising:
at least one storage device; and
at least one processing circuit, coupled to the at least one storage device, wherein the at least one storage device stores instructions, and the at least one processing circuit is configured to execute the instructions of:
communicating with a base station (BS) via a first cell;
receiving a radio resource control (RRC) message configuring the user equipment to connect to a second cell, from the first cell;

connecting to the second cell according to the RRC message, and transmitting a RRC response message for responding to the RRC message to the second cell; and exchanging a plurality of Evolved Packet System (EPS) Non Access Stratum (NAS) messages with an Evolved Packet Core (EPC) network according to an EPS NAS protocol via the second cell, when the RRC message does not include a Protocol Data Unit (PDU) Session Identity (ID), includes an EPS bearer ID or includes a handover type of a "5GStoEPS".

2. The user equipment of claim 1, wherein the instructions further comprise:

exchanging a second plurality of 5GS NAS messages with a second 5GC network according to a second 5GS NAS protocol via the second cell, when the RRC message includes the PDU Session ID or includes a handover type of an "Intra5GS".

3. The user equipment of claim 1, wherein the RRC message includes a handover security configuration defined in the 3rd Generation Partnership Project (3GPP) specification and the handover security configuration includes the handover type of the "5GStoEPS".

4. The user equipment of claim 1, wherein the instructions further comprise:

exchanging the plurality of EPS NAS messages with the EPC network according to the EPS NAS protocol via the second cell, when the RRC message does not include the PDU Session ID and includes the EPS bearer ID.

5. A user equipment for handling a handover, comprising:
at least one storage device; and
at least one processing circuit, coupled to the at least one storage device, wherein the at least one storage device stores instructions, and the at least one processing circuit is configured to execute the instructions of:

communicating with an Evolved Universal Terrestrial Radio Access (EUTRA) base station (BS) and exchanging a plurality of Evolved Packet System (EPS) Non Access Stratum (NAS) messages with an Evolved Packet Core (EPC) network according to an EPS NAS protocol via the EUTRA BS;

receiving a radio resource control (RRC) message configuring the user equipment to connect to an EUTRA cell, from the EUTRA BS;

connecting to the EUTRA cell according to the RRC message, and transmitting a RRC response message for responding to the RRC message to the EUTRA cell; and exchanging a plurality of fifth generation (5G) system (5GS) NAS messages with a 5G Core (5GC) network according to a 5GS NAS protocol via the EUTRA cell, when the RRC message includes a Protocol Data Unit (PDU) Session Identity (ID) or includes a handover type of a "EPSto5GS".

6. The user equipment of claim 5, wherein the instructions further comprise:

exchanging the plurality of EPS NAS messages according to the EPS NAS protocol via the EUTRA cell, when the RRC message does not include the PDU session ID, does not include a handover security configuration defined in the 3rd Generation Partnership Project (3GPP) specification, includes an EPS bearer ID or includes a handover security configuration indicating an "IntraLTE".

7. A user equipment for handling a handover, comprising:
at least one storage device; and
at least one processing circuit, coupled to the at least one storage device, wherein the at least one storage device stores instructions, and the at least one processing circuit is configured to execute the instructions of:

communicating with a base station (BS) and exchanging a plurality of fifth generation (5G) system (5GS) Non Access Stratum (NAS) messages with a 5G Core (5GC) network according to a 5GS NAS protocol via the BS;

receiving a radio resource control (RRC) message configuring the user equipment to connect to an Evolved Universal Terrestrial Radio Access (EUTRA) cell, from the BS;

connecting to the EUTRA cell according to the RRC message, and transmitting a RRC response message for responding to the RRC message to the EUTRA cell; and exchanging a plurality of Evolved Packet System (EPS) NAS message according to an EPS NAS protocol via the EUTRA cell, when the RRC message includes a full configuration indicator or does not include a handover security configuration defined in the 3rd Generation Partnership Project (3GPP) specification.

8. The user equipment of claim 7, wherein the instructions further comprise:

exchanging the plurality of EPS NAS messages according to the EPS NAS protocol via the EUTRA cell, when the RRC message does not include a Protocol Data Unit (PDU) Session Identity (ID), includes an EPS bearer ID, includes a handover security configuration indicating an "IntraLTE" or includes a Core Network (CN) type indicating an "EPC".

* * * * *